(12) United States Patent
Cavagnaro et al.

(10) Patent No.: US 8,182,206 B2
(45) Date of Patent: May 22, 2012

(54) RING SEALS FOR GAS SEALING AND VIBRATION DAMPING

(75) Inventors: Augustine J Cavagnaro, Flat Rock, NC (US); David Carter, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 491 days.

(21) Appl. No.: 12/442,170

(22) PCT Filed: Oct. 15, 2007

(86) PCT No.: PCT/US2007/081362
§ 371 (c)(1),
(2), (4) Date: Mar. 20, 2009

(87) PCT Pub. No.: WO2008/048918
PCT Pub. Date: Apr. 24, 2008

(65) Prior Publication Data
US 2009/0252599 A1 Oct. 8, 2009

Related U.S. Application Data

(60) Provisional application No. 60/829,702, filed on Oct. 17, 2006.

(51) Int. Cl.
*F01D 29/66* (2006.01)
(52) U.S. Cl. ...................................................... 415/119

(58) Field of Classification Search .................. 415/119, 415/214.1; 285/267, 226; 277/590; 60/612
See application file for complete search history.

(56) References Cited

U.S. PATENT DOCUMENTS

| 4,032,262 | A | | 6/1977 | Zehnder |
| 4,339,922 | A | | 7/1982 | Navarro |
| 4,344,289 | A | * | 8/1982 | Curiel et al. ................... 60/612 |
| 4,607,851 | A | * | 8/1986 | Usher ........................... 264/258 |
| 4,928,998 | A | * | 5/1990 | Brandener ..................... 285/49 |
| 6,312,022 | B1 | * | 11/2001 | Brophy et al. ............... 285/268 |
| 6,357,234 | B1 | | 3/2002 | Gladden |
| 6,948,744 | B2 | * | 9/2005 | Atansoski et al. ........... 285/226 |
| 7,017,706 | B2 | | 3/2006 | Brown et al. |

* cited by examiner

*Primary Examiner* — Alexander Gilman
(74) *Attorney, Agent, or Firm* — William G. Anderson; Stephan A. Pendorf; Patent Central LLC

(57) ABSTRACT

A connection device for connecting two turbine housings (1, 2) of a two-stage turbocharging system includes a male/female joint for joining the two turbine housings; a cylindrical ring seal (3) installed under compression inside the male/female joint for sealing exhaust gas; and a vibration damper (4) in a shape of a flat washer and placed between the two housings. The cylindrical ring seal can be made of stainless steel mesh impregnated with vermiculite or graphite. The vibration damper can be made of stainless steel mesh but not impregnated.

18 Claims, 2 Drawing Sheets

RING SEALS FOR GAS SEALING AND VIBRATION DAMPING

FIELD OF THE INVENTION

The present invention relates to a two-stage turbocharging system for an internal combustion engine and more particularly to a cylindrical radial seal between the turbine stages and a vibration damper between the housings.

BACKGROUND OF THE INVENTION

Turbochargers are a type of forced induction system. They compress the air flowing into an engine, thus boosting the engine's horsepower without significantly increase its weight. Turbochargers use the exhaust flow from the engine to spin a turbine, which in turn spins an air compressor. Since the turbine spins about 30 times faster than most car engines and it is hooked up to the exhaust, the temperature in the turbine are very high.

One of the main problems with turbochargers is that they do not provide an immediate power boost when you step on the gas, so-called turbo lag or boost lag. One way to decrease turbo lag is to reduce the diameter of the turbine. However, a smaller turbine does not provide enough boost at high engine speeds. It is also in danger of spinning too quickly at higher engine speeds when lots of exhaust is passing through the turbine. A larger turbocharger can provide lots of boost at high engine speeds, but may have bad turbo lag because of how long it takes to accelerate its heavier turbine and compressor.

Twin-turbo systems have been designed to solve the above problem. A twin-turbo system can be a parallel twin-turbo system or a sequential twin-turbo system. A parallel twin-turbo system has two small turbos, one being active across the entire revolution range of the engine and the other becoming active at higher RPM. A sequential twin-turbo system, also called a two-stage turbocharging system, uses two turbochargers of different sizes. The smaller one spins up to speed very quickly, reducing lag, while the bigger one takes over at higher speeds to provide more boost.

Conventionally, the larger low pressure (LP) and smaller high pressure (HP) turbine housings of a two-stage turbocharging system are connected rigidly by, for example, a V-band connection and slip joint, in order to prevent exhaust gas leak. However, this kind of rigid connection could cause stresses under high temperature due to thermal expansion.

In some two-stage turbocharging systems, the smaller unit can be cantilevered off the larger unit so it is free to grow under thermal conditions. However, when both turbine units are sufficiently large, since this kind of connection does not provide reliable support, both turbine units have to be rigidly mounted to the engine, which means that under thermal growth, large stresses would be created if the mounting flanges were rigid.

SUMMARY OF THE INVENTION

Accordingly, one of the objects of the present disclosure is to provide a connection between the turbine housings in a two-stage turbocharging system, which provides reliable support and at the mean time provides the necessary exhaust gas seal at high and low operating temperatures and also allows for thermal growth of the housings.

In order to achieve the above object, the present disclosure provides a wire mesh device, preferably made of stainless steel and impregnated with vermiculite, graphite or other suitable media, as a radial seal between the turbine stages of a two-stage turbocharging system, which are connected by a male/female joint. The impregnated mesh device is in the shape of a thin walled cylindrical ring and is installed under compression inside the male/female joint that connects the two turbine housings. This radial seal provides the necessary exhaust gas seal at high and low operating temperatures and at the mean time allows for thermal growth of the housings in that the male/female joint is capable of sliding along its principal axis without destroying the seal. This kind of connection also has the benefit that the two turbocharger units could be effectively decoupled and could grow with temperature without causing stress.

Decoupling the turbocharger units may have a negative effect on first mode frequency since the system was less rigid. To account for this, a second mesh ring, preferably also made of stainless steel, in the shape of a flat washer is placed between the housings to act as a vibration damper. The second ring is made of similar material as the radial seal, but not impregnated. It has its "elastic modulus" (such as wire diameter and density) tuned to dampen vibration in the range of excitation, thus achieving the modal response necessary in the system.

Further advantages and embodiments of the invention can be seen from the following description and the associated drawings.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Figure 1:
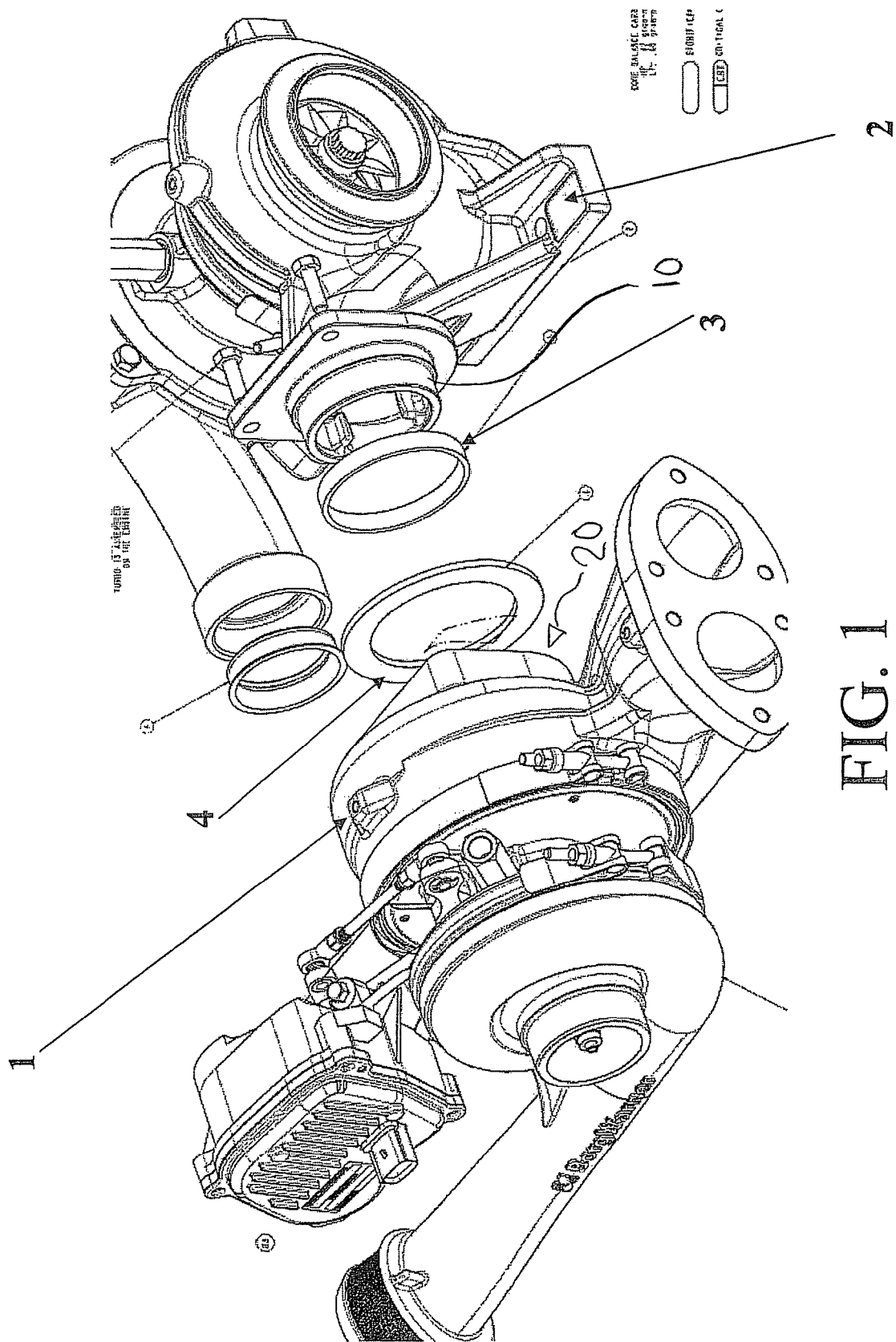
FIG. 1 is a perspective view of a two-stage turbocharger in accordance with inventive aspects of the present disclosure.
Figure 2:
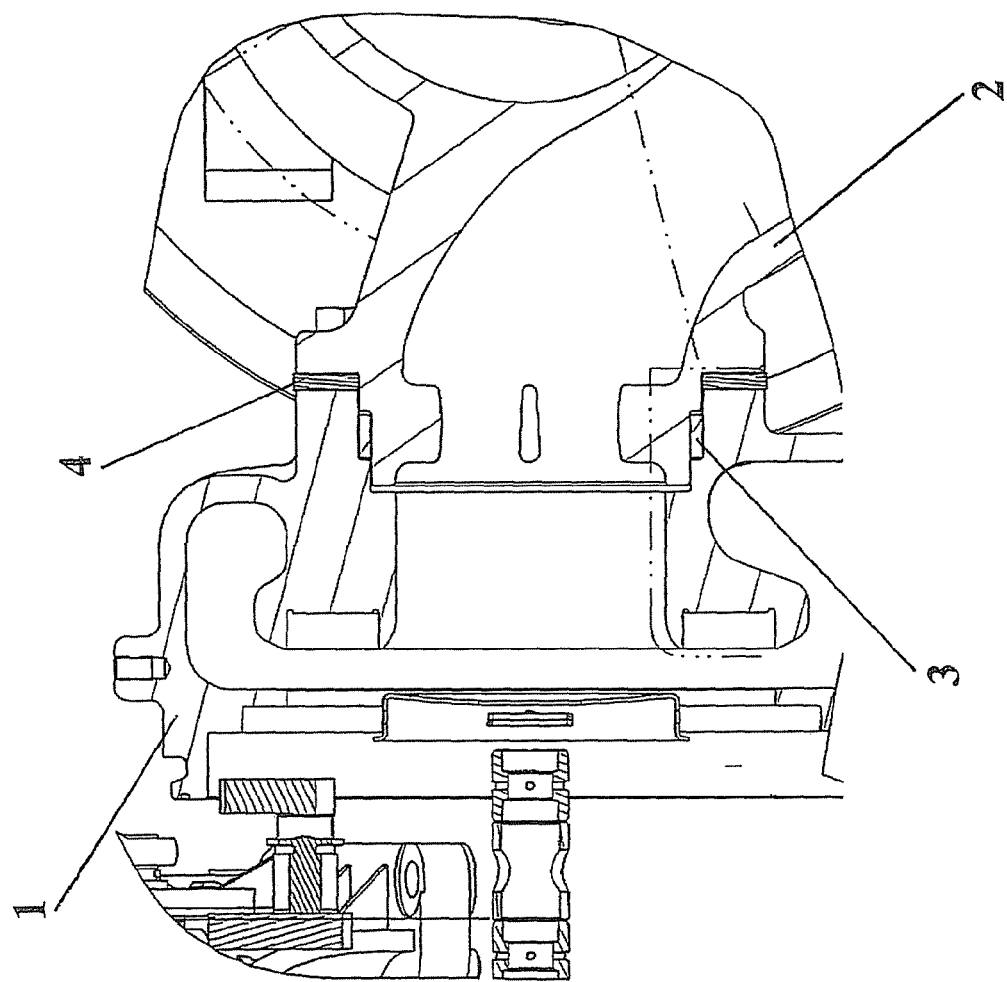
FIG. 2 is a sectional view showing the connection of the two turbine housings.

FIGS. 1-2 show the location of the seal 3 and the damper 4 in relation to the high pressure (FP) turbine housing 1 and the low pressure (LP) turbine housing 2 of a two-stage turbocharger.

In one embodiment, the seal 3 and the damper 4 according to the present disclosure can work under the following operating conditions: maximum temperature of approximately 750° C.; approximate linear growth between housings of 1-2 mm; material for both castings of the housings 1, 2 is HiSiMo Iron; first mode of frequency is greater than 300 Hz; and minimum number of thermal cycles is approximately 10,000.

In one embodiment, the radial seal 3 can be made of knitted wire mesh of 300 series stainless steel and can have a wire diameter of about 0.20 mm. The present disclosure also contemplates the use of other materials based on a number of factors, such as cost (e.g., low carbon steel, 400 series stainless steel, etc.). However, due to moisture content in the exhaust gas and the nature of the iron housings, corrosion may occur which would limit the ability of the housings 1, 2 to grow/shrink as necessary without destroying the seal 3. Higher cost materials (e.g., nickel alloy, austenitic nickel-based superalloys, INCONEL®, etc.) can also be used although the benefit vs. cost should be considered. The diameter of the wire used to form the seal 3 can be in the range of 0.15-0.30 mm. The wire in the seal 3 can act as a skeleton to hold the lubricious material, such as vermiculite, graphite, etc., in a geometric shape and to provide some rigidity. The sealing capability of the part can be less sensitive to wire diameter. The impregnated mesh device can be in the shape of a thin-walled cylindrical ring and can be installed under compression inside the male/female joint formed by the male coupling structure 10 and the female coupling structure 20 that connect the two turbine housings 1, 2. The mesh seal 3 can have a thickness in the range of 3.0-6.0 mm and can have a density of 70-80% of wire content.

In another embodiment, the wire mesh seal 3 can be impregnated with vermiculite slurry. The seal 3 can also be impregnated with graphite or other suitable media. The vermiculite slurry, graphite or other suitable media can have properties as follows:
  a) thermal capability to withstand steady state temps of greater than 750 C;
  b) durability at installation when compressed between the housings 1, 2 without delaminating;
  c) durability in service so that thermal cycles and sliding friction do not cause delamination; and
  d) lubricity over the operating temperature range so that the parts slide in relation to each other over the seal surfaces.

In another embodiment, the damper 4 can be made of knitted wire mesh, such as of 300 series stainless steel having a wire diameter of about 0.28 mm and a density of about 25%. In a preferred embodiment, the damper 4 is not impregnated. Similar to the seal 3, other lower or higher cost materials may also be used, but the possibility of corrosion and cost should be taken into consideration.

The wire diameter of the damper 4 can be in the range of 0.10-0.40 mm. Unlike in the seal 3, it has been found that the wire diameter can be one of the critical characteristics of the damper 4. Along with density, these two characteristics allow "tuning" of the damper 4 to provide the necessary elastic modulus for thermal growth and vibration damping. Damper density can be dependant on thermal growth, necessary modal response and the wire diameter chosen. For the particular application in which these parts were designed, density should be limited to between 15 and 25%. Depending on the variables described, density could range anywhere from 10-80%. Depending on wire diameter, thermal growth and modal response, generally, 2.0-10.0 is a preferred range for the thickness of the damper 4.

Seals have been used in exhaust manifolds and other pipe-type applications, while damper rings have also been used in other applications. However, the inventors of the present disclosure apply the seal 3 and damper 4 of the present disclosure together in a two-stage turbocharging system to decouple the exhaust joint in order to allow thermal growth of the housings 1, 2 while solving the problem of leak and modal response.

Although seals have been used in exhaust manifold, it is a common perception that certain seals cannot be used in a turbocharger because the temperature is significantly higher in a turbocharger than in a regular exhaust manifold. Also, the problem of leaking is not as critical in a regular exhaust manifold as in a turbocharger.

While the invention has been described by reference to specific embodiments chosen for purposes of illustration, it should be apparent that numerous modifications could be made thereto by those skilled in the art without departing from the spirit and scope of the invention.

We claim:

1. A connection device for connecting two turbine housings (1, 2) of a two-stage turbocharging system, comprising:
    a male/female joint (10, 20) for joining the two turbine housings;
    a cylindrical ring seal (3) installed under compression inside the male/female joint for sealing exhaust gas; and
    a vibration damper (4) in a shape of a flat washer and positioned between the two turbine housings,
    wherein the cylindrical ring seal is made of wire mesh impregnated with a material, and the vibration damper is made of wire mesh that is not impregnated.

2. The connection device according to claim 1, wherein the wire mesh of at least one of the cylindrical ring seal and the vibration damper is made of stainless steel.

3. The connection device according to claim 2, wherein the wire mesh is made of 300 series stainless steel.

4. The connection device according to claim 1, wherein the impregnated material is chosen based on criteria including thermal capability, durability at installation, durability in service, and lubricity over temperature range.

5. The connection device according to claim 1, wherein the impregnated material is vermiculite or graphite.

6. The connection device according to claim 1, wherein the vibration damper has an elastic modulus which is tuned to dampen vibration in the range of excitation.

7. The connection device according to claim 6, wherein the elastic modulus includes a wire diameter and a woven density.

8. The connection device according to claim 7, wherein the wire diameter is about 0.10-0.40 mm and density is about 10-80%.

9. The connection device according to claim 8, wherein the wire diameter is about 0.28 mm and the density is about 15-25%.

10. The connection device according to claim 1, wherein the cylindrical ring seal has a wire diameter of about 0.15-0.30 mm, a thickness of about 3.0-6.0 mm, and a density of about 70-80% of wire content.

11. The connection device according to claim 10, wherein the cylindrical ring seal has a wire diameter of about 0.20 mm.

12. The connection device according to claim 10, wherein the damper has a thickness of about 2.0-10.0 mm.

13. A two stage turbocharger system comprising:
    a first turbine having a housing (2) with a male coupling (10);
    a second turbine having a housing (1) with a female coupling (20), wherein the male and female coupling are connectable to form a male/female joint;
    a cylindrical ring seal (3) installed under compression inside the male/female joint for sealing exhaust gas; and
    a vibration damper (4) in a shape of a flat washer and placed between the two housings, wherein the cylindrical ring seal is made of wire mesh impregnated with a material, and the vibration damper is made of wire mesh that is not impregnated.

14. The system according to claim 13, wherein the wire mesh of at least one of the cylindrical ring seal and the vibration damper is made of stainless steel.

15. The system according to claim 14, wherein the impregnated material is vermiculite or graphite.

16. The system according to claim 13, wherein the vibration damper has an elastic modulus which is tuned to dampen vibration in the range of excitation.

17. The system according to claim 13, wherein the cylindrical ring seal has a wire diameter of about 0.15-0.30 mm, a thickness of about 3.0-6.0 mm, and a density of about 70-80% of wire content.

18. The system according to claim 13, wherein the vibration damper has a thickness of about 2.0-10.0 mm.

* * * * *